Dec. 23, 1941.    F. C. CRAWFORD    2,266,742
FLEXIBLE PISTON RING
Filed June 10, 1939
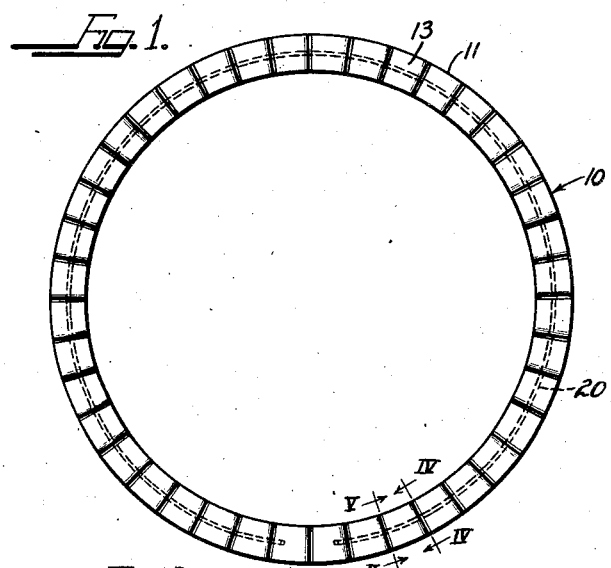
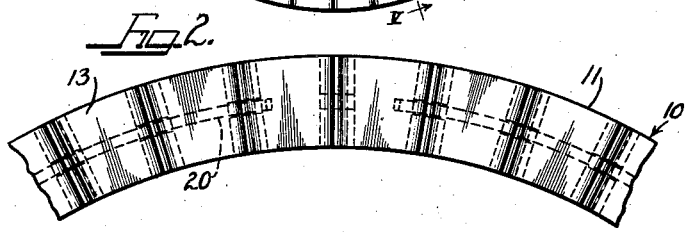
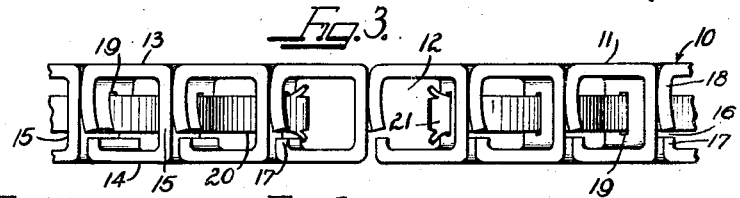
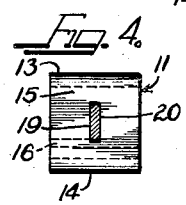
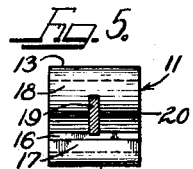
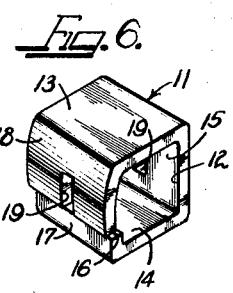
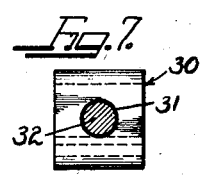
Inventor
FREDERICK C. CRAWFORD
by Charles A. Hill
Attys.

Patented Dec. 23, 1941

2,266,742

UNITED STATES PATENT OFFICE 2,266,742

FLEXIBLE PISTON RING

Frederick C. Crawford, Cleveland, Ohio, assignor to Thompson Products, Incorporated, Cleveland, Ohio, a corporation of Ohio Application June 10, 1939, Serial No. 278,433

16 Claims. (Cl. 309—45)

This invention relates to packing rings. More particularly it pertains to a circumferentially resilient piston ring comprising a plurality of radially extending laterally abutting cells.

It has heretofore been proposed to fabricate piston rings comprising a plurality of radially extending tubes joined laterally to form an integral one-piece ring structure.

The present invention departs radically from the prior art in providing a circumferentially resilient piston ring comprising a plurality of radially extending laterally abutting independent cells held together by a circumferential tie wire so as to permit relative circumferential movement of the parts. Each cell presents a roughly square end view, and one vertical wall of each cell is radially slotted and bent to form a laterally projecting cantilever spring permitting elastic circumferential compression of the ring.

It is therefore an important object of the present invention to provide a circumferentially and axially resilient piston ring comprising a plurality of radially extending laterally abutting cells held together by a circular tie wire permitting relative circumferential movement.

Another important object of this invention is to provide a flexible piston ring comprising a plurality of radially extending cells with outwardly curved side walls forming laterally projecting springs.

A specific object is to provide a circumferentially resilient piston ring composed of tied together individual metal cells each having a slotted outwardly bent side wall forming a cantilever spring.

Other and further important objects of the present invention will be apparent from the disclosure in the specification and the accompanying drawing.

This invention (in a preferred form) is illustrated in the drawing and hereinafter more fully described.

In the drawing:

Figure 1 is a top plan view of an assembled piston ring embodying the principles of the present invention.

Figure 2 is a fragmentary enlarged top plan view of the ring of Figure 1.

Figure 3 is a fragmentary enlarged perspective side view of the ring of Figure 1.

Figure 4 is an enlarged cross-sectional view taken along the line IV—IV of Figure 1.

Figure 5 is an enlarged cross-sectional view taken along the line V—V of Figure 1.

Figure 6 is an enlarged perspective view of one of the cells forming the piston ring.

Figure 7 is a view similar to Figure 4 but illustrating a modified cell aperture and tie wire according to this invention.

As shown on the drawing:

In Figures 1, 2 and 3 the reference numeral 10 indicates generally a piston ring embodying the principles of the present invention. The ring 10 is composed of a plurality of similar convergent radially disposed cells 11 fabricated from resilient sheet metal. Each cell 11 defines a roughly square radially open ended oil passage 12.

As shown in the perspective view of the ring 10 in Figure 3 and in the views of an individual cell 11 in Figures 4, 5 and 6, each cell 11 comprises a flat horizontal top wall 13 and a flat horizontal bottom wall 14. The top and bottom walls are connected by a vertical side wall 15. The other wall of each cell 11 is traversed by a radial slot 16 adjacent to but spaced from the bottom horizontal wall 14. The lower segment of the radially slotted vertical wall is designated with the reference numeral 17. The upper segment is curved outwardly to form a cantilever spring or tongue 18 projecting laterally about 0.005 inch.

As shown in Figures 1 and 2, each cell 11 converges inwardly so as to provide an outer face that is larger than the inner face. The side walls of adjacent cells can thus contact along substantially their entire length when the cells are annularly disposed as shown.

Both the walls 15 and the tongues 18 are pierced by rectangular transverse slots 19 aligned along the body axis of the ring 10 and spaced from the horizontal walls 13 and 14. A circumferential tie wire 20 of rectangular cross section extends movably through all the cells 11 and all but two of the slots 19. The ends 21 of the tie wire 20 are split and flared to project over the edges of the slots 19 adjacent thereto. All adjacent cells 11 are thus tied together at both sides thereof except the pair of adjacent cells receiving the ends of the tie wire as shown in Figure 3. These cells can be spread apart from each other to expand the ring for permitting its insertion into a piston ring groove.

In Figure 7 the reference numeral 30 indicates generally a modification of the ring 10. In this modification the ring is composed of cells such as 30 whose side walls are pierced by transverse circular slots 31 for receiving a tie wire 32 of circular cross section.

The ring 10 is compressed circumferentially as shown in Figure 3 when in operating position in the groove of a piston within the cylinder of an internal combustion engine. For a given cylinder a ring 10 is suitably selected having a circumference slightly larger than the inside of the cylinder. The ring 10 must then be compressed circumferentially to permit the insertion into the cylinder of the piston on which it is mounted. During this compression the spaced ends 21 of the tie wire 20 approach each other, and as the cells 11 slide over the tie wire 20, the tongues 18 are forced against the walls 15 so as to contact the latter above the slots 19 whereby an oil tight seal is effected. The both circumferentially and radially directed spring action of the compressed tongues 18 urges the ring 10 against the inner face of the cylinder with a force equal at all points.

The cells 11 or 30 of the ring 10 may be fabricated by laterally slotting and expanding short tubes of roughly square cross section which previously have been slotted transversely. Alternatively, resilient sheet metal may be bent into laterally open and expanded cellular cross section, and the bent sheet cut into short lengths which are slotted transversely. The finished cells 11 or 30 are threaded transversely with the tie wire 20, and the ends of the latter are split and flared.

However made, the present piston ring comprises broadly a series of radially directed cells of resilient sheet metal having laterally expanded cantilever springs and means for holding said cells in circular alignment. Said means comprises suitably a circular tie wire threading transverse slots piercing said cells along the body axis of said ring. The cantilever spring may be formed by radially slotting and laterally expanding one vertical wall of each of said cells.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A packing ring comprising a split annular member composed of individual open faced cells each having a resilient side wall and a tie threaded through said cells to hold the same together.

2. A packing ring comprising a split annular member composed of individual open faced cells, each of said cells having a dependent side wall forming an outwardly expanded cantilever spring, and a tie threaded through said cells to hold the same together.

3. A piston ring comprising a plurality of similar laterally abutting radially extending cells of resilient sheet metal, each of said cells having a radially slotted laterally expanded vertical wall and means for holding said cells in circular alignment.

4. A piston ring comprising a series of similar radially extending transversely slotted cells of resilient sheet metal, each of said cells having a slotted vertical wall curved to form a laterally projecting tongue, and a circular tie wire threading said cells transversely.

5. A piston ring comprising a plurality of relatively movable radially extending cells of resilient sheet metal having upper and lower horizontal walls, a transversely slotted vertical wall connecting said horizontal walls, and a vertical transversely slotted laterally expanded wall segment extending from one of said horizontal walls but spaced from the other, and a tie wire extending through said slots to hold said cells together.

6. A piston ring comprising a plurality of laterally abutting radially extending transversely slotted cells of resilient sheet metal having a roughly rectangular cross section, one vertical wall of each of said cells being curved outwardly and having a free end, and a tie wire threading said cells transversely.

7. A metallic packing ring comprising a plurality of radially perforated laterally resilient elements and a ring member for holding said elements in circular alignment with the lateral faces of the elements in abutting relationship.

8. A packing ring comprising a series of similar radially extending cells of resilient sheet metal having laterally expanded cantilever springs and a ring member for holding said cells in circular alignment with the lateral faces of the cells in abutting relationship.

9. A piston ring comprising a plurality of laterally abutting radially extending transversely slotted cells of resilient sheet metal having a roughly square cross section, one vertical wall of each of said cells being curved outwardly and having a free end, and a tie wire threading said cells transversely.

10. A piston ring comprising a plurality of laterally abutting radially extending transversely slotted cells of resilient sheet metal having a roughly rectangular cross section, one vertical wall of each of said cells being curved outwardly and slotted radially along a line adjacent to but spaced from the bottom of said cells.

11. A piston ring comprising a plurality of laterally abutting radially extending transversely slotted cells of resilient sheet metal having a roughly rectangular cross section, one vertical wall of each of said cells being curved outwardly and having a free end, the transverse slots in said cells being aligned circularly intermediate and spaced from the longitudinal walls of said cells, and a tie wire threading said cells transversely.

12. A piston ring comprising a plurality of laterally abutting radially extending transversely slotted cells of resilient sheet metal having a roughly rectangular cross section, one vertical wall of each of said cells being curved outwardly and having a free end, the transverse slots in said cells being aligned along the body axis of said ring, and a tie wire threading said cells transversely.

13. A piston ring comprising a plurality of laterally abutting radially extending transversely slotted cells of resilient sheet metal having a roughly rectangular cross section, one vertical wall of each of said cells being curved outwardly and having a free end, and a tie wire threading said cells, transversely, the transverse slots of said cells and the cross section of said tie wire being rectangular.

14. A piston ring comprising a plurality of laterally abutting radially extending transversely slotted cells of resilient sheet metal having a roughly rectangular cross section, one vertical wall of each of said cells being curved outwardly and having a free end, and a split tie wire having two spaced ends threading said cells transversely.

15. A piston ring comprising a plurality of laterally abutting radially extending transversely slotted cells of resilient sheet metal having a roughly rectangular cross section, one vertical wall of each of said cells being curved outwardly and having a free end, and a tie wire transversely threading all said cells and all but two of said transverse slots.

16. A piston ring comprising a plurality of laterally abutting radially extending transversely slotted cells of resilient sheet metal having a roughly rectangular cross section, one vertical wall of each of said cells being curved outwardly and having a free end, and a tie wire transversely threading all said cells and all but two of said transverse slots, the ends of said tie wire being flared to project over the edges of said two transverse slots.

FREDERICK C. CRAWFORD.